United States Patent [19]

Massa

[11] 4,084,150
[45] Apr. 11, 1978

[54] UNDERWATER DEPTH SOUNDER WITH VARIABLE BEAM TRANSDUCER

[75] Inventor: Frank Massa, Randolph, Mass.

[73] Assignees: Fred M. Dellorfano, Jr.; Donald P. Massa, both of Cohasset, Mass.

[21] Appl. No.: 687,024

[22] Filed: May 17, 1976

[51] Int. Cl.² .................................... H04B 13/00
[52] U.S. Cl. ............................ 340/8 R; 340/3 C
[58] Field of Search ............ 340/1 R, 3 R, 3 C, 8 R, 340/9, 10, 11, 12; 73/67.8 R, 67.8 S; 128/2 V, 24 A, 2.05 Z

[56] References Cited

U.S. PATENT DOCUMENTS

| | | | |
|---|---|---|---|
| 2,545,922 | 3/1951 | Gray | 340/3 C |
| 2,729,765 | 1/1956 | Saunders | 340/3 C |
| 2,769,160 | 10/1956 | Fryklund | 340/3 C |
| 2,875,355 | 2/1959 | Petermann | 340/9 X |
| 3,086,195 | 4/1963 | Halliday | 73/67.8 S X |
| 3,090,030 | 5/1963 | Schuck | 340/1 R |
| 3,277,451 | 10/1966 | Parssinen | 340/10 X |
| 3,307,141 | 2/1967 | Saxton et al. | 340/3 C |
| 3,457,543 | 7/1969 | Akervold et al. | 340/10 |
| 3,681,747 | 8/1972 | Walsh | 340/3 R |
| 3,942,149 | 3/1976 | Westfall, Jr. | 340/3 C |
| 3,953,824 | 4/1976 | Dean | 340/3 C |

Primary Examiner—Harold Tudor

[57] ABSTRACT

An improved depth sounder combines a multi-beam ultrasonic transducer with a multi-range selector switch with provisions for automatically selecting a particular beam pattern for a particular range setting. The relationship between beam patterns and depth ranges is uniquely chosen to provide equal areas of insonification at each full scale range setting. The inventive system also provides an additional scale on the multi-scale range dial which shows the diameter of the insonified region in the vicinity of the reflecting target in addition to the target depth.

8 Claims, 4 Drawing Figures

U.S. Patent        April 11, 1978        4,084,150
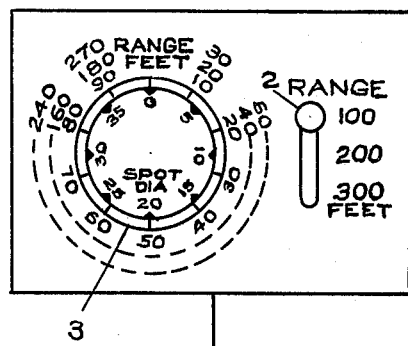

UNDERWATER DEPTH SOUNDER WITH VARIABLE BEAM TRANSDUCER

This invention is an improvement in underwater depth sounders, particularly in depth sounders commonly used as "fish finders". For the conventional depth sounders that are in widespread general use there are two conflicting requirements that cannot both be satisfactorily met in a single instrument: a relatively narrow beam angle transducer is required for achieving the high system sensitivity needed for making measurements at relatively large depths, and a relatively broad beam transducer is required for covering the desired area of search in relatively shallow depths. This invention provides a solution to this problem by designing a multi-range depth sounder in combination with a multi-beam transducer and including means for automatically selecting the particular beam pattern which best serves the system requirements for each setting of the range selector control switch.

The primary object of this invention is to improve the performance characteristic of an underwater depth sounder.

Another object of this invention is to provide a multi-beam ultrasonic transducer in combination with a multi-range depth sounder which is capable of being operated with different selectable beam patterns for different settings of the range selector control knob.

A still further object of this invention is to provide a transducer having a plurality of beam patterns in combination with beam selection means for providing different beam patterns for different settings of the range selector control knob.

A further object of this invention is to provide a multi-beam transducer in combination with a multi-range underwater depth sounder so that the area of insonification at the different full scale depth ranges will remain constant for each setting of the range selector switch.

Another object of this invention is to provide a calibrated scale on the face of the indicating meter of the inventive depth sounder which shows the area of the region being insonified in the vicinity of the reflecting target as well as the depth of the target.

The novel features which are characteristic of this invention are set forth with particularity in the appended claims. The invention itself, however, both as to its method of operation as well as additional objects and advantages thereof will be best understood by reference to the following description taken in conjunction with the accompanying drawings:

FIG. 1 is a schematic view of an underwater depth sounder illustrating one embodiment of the teachings in this invention.

FIG. 2 is a plan view illustrating a schematic design of a multi-beam transducer for use in the subject invention.

FIG. 3 is a cross-sectional view taken along the line 3—3 of FIG. 2 and also includes a schematic wiring diagram of the transducer connections that are made for each setting of the range switch to accomplish the objects of the invention.

FIG. 4 illustrates the different beam patterns that are produced by the transducer construction illustrated in FIG. 2 for the different electrical connections that occur for the different positions of the range selector switch in FIG. 3.

Referring more particularly to the figures, FIG. 1 shows a schematic illustration of the inventive system in which the reference character 1 represents a conventional multi-range prior art depth sounder which includes a range selector knob 2 which may be set to either 100 ft., 200 ft., or 300 ft. range. A circular dial 3 is shown marked around its outer periphery with three scales of depth readings corresponding to each of the selectable ranges. An ultransonic underwater transducer 4 is usually attached to the boat and faces directly down in the water with the transducer axis parallel to the vertical axis of the boat. The operation of the conventional depth sounder makes use of a small diameter tubular gas discharge lamp which rotates over the circular scale 3 and acts as a moving pointer over the marked scale. The speed of rotation is controlled by the position of range selector knob 2 so that the lamp makes exactly one revolution during the time it takes for a tone burst of sound to travel the round trip distance from the transducer to the full scale depth selected by the range selector knob 2. At the instant that the rotating tubular lamp passes through zero on the face of the dial 3, the transducer 4, which has a fixed beam pattern in the prior art depth sounder, is connected for an instant to the ultrasonic power supply, and an ultrasonic tone burst is generated by the transducer. None of the circuit details and switching means for accomplishing the described conventional operating functions are shown because they are all very well known in the art and are not part of this invention. The invention is only in the new combination of well known components of conventional multi-range prior art depth sounders and a multi-beam transducer with a unique combination of beam width characteristics to achieve the novel improvements in depth sounders as described herein. Upon striking a sound reflecting object, the ultrasonic sound pulse is reflected and returned to the transducer, which now acts as a receiver, and at the instant of arrival of the reflected sound pulse, the amplified received signal causes the gas discharge tube to ignite thus illuminating its position on the face of dial 3 during its orbit which corresponds to the depth of the reflecting target.

When a conventional prior art depth sounder is used for locating schools of fish, the deeper the water in which the fish are swimming the greater will be the ambiguity in locating the position of the fish. In other words, for the conventional depth sounder using a conventional transducer with a single fixed beam pattern, the greater the depth of the fish, the larger will be the insonified area of water so that any fish swimming off to either one side or the other away from the vertical axis of the boat will give readings which will be interpreted the same as if the fish were swimming directly beneath the boat, which causes considerable ambiguity in establishing the true location of the fish. In order to correct this ambiguity, Applicant uses a multi-beam transducer in combination with a multi-range depth sounder. The transducer is connected to the system through the range selector switch in such a manner that the beam angle of the transducer becomes progressively narrower the greater the range which is selected for the depth measurement.

FIG. 1 shows an illustrative example of the inventive system which embodies a preferred form of Applicant's invention utilizing a multi-beam transducer with three selectable beam angles which are selectively connected to the electronic circuit by the position of range selector knob 2 so that the transducer beam angle is made smaller the greater the range setting of the instrument. FIGS. 2 and 3 illustrate schematically the construction of a multi-beam transducer suitable for use in Applicant's inventive system. Also shown schematically in FIG. 3 is the manner in which the transducer sections are electrically connected to produce the preferred choice of beam pattern for each setting of the range selector knob 2. As a specific example to illustrate a preferred embodiment of Applicant's invention, a three section transducer is shown which produces the three specific beam patterns illustrated in FIG. 1 which are indicated as 25°, 12½° and 8° for the respective range settings of 100 ft., 200 ft. and 300 ft.

The internal construction of transducer 4 is illustrated in FIGS. 2 and 3 and comprises three concentric operating sections which includes a central disc portion of polarized ceramic 5 surrounded by two concentric ring portions 6 and 7. The concentric sections are separated by corprene layers 8 and 9 in the conventional manner, as illustrated. A separate electrical conductor 10, 11 and 12 is soldered to each of the bottom electrode surfaces of the ceramic elements 5, 6 and 7 as illustrated in FIG. 3, and the opposite ends of the conductors are connected to the electrical contact terminals 13, 14 and 15 as shown. A contact terminal 16 is attached to the range selector knob 2 and an electrical conductor 17 makes connection from the terminal 16 to the electronic circuit for operating the depth sounder. A second electrical conductor 18 is connected to all of the top electrode surfaces of the ceramic elements, as illustrated, and the free end of the conductor 18 is used to complete the electrical connection from the transducer to the electronic circuit of the depth sounder in the conventional manner. The details of the electronic circuit components are not shown because they are well known in the art and do not in themselves form any part of this invention.

With the range selector knob 2 set in the 100 ft. range position, as illustrated in FIG. 3, only the central disc portion 5 of the ceramic transducer structure is connected to the circuit, and the transducer is operating in its wide beam mode with a piston diameter $d_1$ which produces the desired 25° beam pattern 19 as illustrated in FIG. 4 and as drawn in FIG. 1. For the 100 ft. range setting, and for the corresponding 25° beam angle selected, the transducer will insonify a circular spot at the 100 ft. depth having a diameter $D_1$ as illustrated in FIG. 1. When the range selector knob 2 is moved to the 200 ft. range position in FIG. 3, contact terminal 16 will move down and deflect contact terminal 13 so that terminals 13 and 14 make contact thus causing the two sections 5 and 6 of the transducers to be connected together and also connected to conductor 17. Under this condition, the transducer is operating with an effective piston diameter $d_2$ which produces the 12½° beam pattern 20 illustrated in FIG. 4 and drawn in FIG. 1. For the 200 ft. range setting, and for the corresponding 12½° beam angle selected, the transducer will insonify a circular spot at the 200 ft. depth having a diameter $D_2$ as shown in FIG. 1. When the range selector 2 is moved to the 300 ft. range position, contacts 16, 13 and 14 are moved downward in FIG. 3 and they all make contact with terminal 15, thus connecting all three sections of the transducer together for operation with an effective piston diameter $d_3$ which produces the 8° beam 21 illustrated in FIG. 4 and drawn in FIG. 1. For the 300 ft. range setting and for the corresponding 8° beam angle selected, the transducer will insonify a circular spot at the 300 ft. depth having a diameter $D_3$ as shown in FIG. 1.

By choosing transducer diameters $d_1$, $d_2$ and $d_3$ in the same relative proportion as the desired depth ranges of 100 ft., 200 ft., and 300 ft. with which the transducers are to be used, the diameters of each of the insonified spots $D_1$, $D_2$ and $D_3$ as shown in FIG. 1 will be equal for each position of the range setting control knob 2, thus achieving one of the objects of the invention. In order to maintain the required linear relationship between the effective transducer diameter and the selected range of operation to insure that the size of the insonified spot diameter remains constant at each full scale range setting it is necessary that the smallest transducer diameter $d_1$, which produces the widest beam pattern, is made greater than the wavelength of the sound being transmitted by the transducer. For piston diameters less than one wavelength the relationship between piston diameter and beam angle is no longer linear (see Page 141 Massa, Acoustic Design Charts, the Blakiston Co., Philadelphia, 1942). For Applicant's design which permits the selection of three specific depth ranges 100 ft., 200 ft. and 300 ft. as illustrated in FIG. 1, $d_1$ was selected to be 2½ times the wavelength of the ultrasonic signal transmitted by the transducer which results in the desired 25° beam pattern as shown in FIG. 1 for the 100 ft. range position. The diameter $d_2$ was made equal to $2d_1$ and $d_3$ equal to $3d_1$ to provide the necessary linear relationship between transducer diameter and range to result in equal insonified areas for all full scale range settings. For the specific beam angles and ranges illustrated in FIG. 1 a uniform insonified spot diameter at each range setting is produced and is equal to approximately 40 ft. diameter. If the diameter of the insonified areas were desired to be smaller than 40 ft., the selected value of $d_1$ would have to be chosen proportionately greater than 2½ wavelengths, and if the insonified areas were desired to be larger than 40 ft. diameter, $d_1$ would have to be chosen proportionately smaller than 2½ wavelengths. The values of $d_2$ and $d_3$ would, of course, always remain equal to $2d_1$ and $3d_1$ to preserve the desired objective of achieving uniformity of insonified spot diameter for all range settings.

Applicant's preferred choice of $d_1$ equal to 2½ wavelengths results in satisfactory operational characteristics of the inventive depth sounder for the depth range values indicated. Some variation from Applicant's preferred 2½ wavelength dimension for $d_1$ at the 100 ft. range will not deteriorate the system performance significantly provided the variation does not exceed approximately 40% of the preferred indicated value, therefore $d_1$ is preferably chosen in the range 1½ to 3½ wavelengths of the transmitted sound for the 100 ft. range setting. For ranges greater than 100 ft., the transducer diameter is increased in direct proportion to the increase in range as previously described.

By providing a multi-beam transducer in combination with a multi-range depth sounder, in which the transducer beam angle varies as a linear function of range setting as described, a constant insonified spot diameter at each full scale range setting will be achieved. An additional useful feature will be provided by the inventive design which is illustrated by the direct reading "SPOT DIA" scale shown superimposed on the inner periphery of the circular dial 3 to indicate the diameter of the target area being insonified at the same time that the depth of the target is being shown on the range scale. The possibility for varying and directly reading the diameter of the insonified area in the vicinity of the target at the same time that the target depth is being read will permit the user of the inventive depth sounder to select a "wide angle view" or a "telephoto close-up" of his under water target which will provide increased resolution possibilities for identifying the target and will eliminate the ambiguities of the conventional prior art single beam systems.

To more completely describe the increased resolving power of the inventive system, reference to FIG. 1 shows that for each of the three ranges settings and with the transducer beam angles selected as shown for each of the range settings the sizes of the insonified spot diameters $D_1$, $D_2$ and $D_3$ at each of the full scale range settings are equal to 40 ft. ida. At less than full scale reading on any range setting, the insonified circle diameter will be decreased. For example, with a target located at ½ full scale range on any one of the three range settings the insonified spot diameter at the target will be approximately 20 ft. Actually, with Applicant's choice of transducer beam angles to insonify the same size area at each of the different full scale range settings, a very useful feature will be made available to the user; namely, the diameter of the circle being insonified in the vicinity of the target will always be proportional to the percent of full scale on the dial where the target depth reading appears. In other words, since the full scale diameter being insonified for each range setting is equal to 40 ft., it is possible for the user to shift range settings and thereby produce the effect of a variable sonar lens which can sharpen or broaden the field of view by simply changing the position of the range selector 2. In fact, the diameter of the circular spot being insonified may be printed directly on the face of the circular dial 3 as shown by the innermost circle of numbers labeled "SPOT DIA." For the chosen example of beam angles and ranges illustrated in FIG. 1, a scale reading from 0 to 40 ft. as marked on the inner periphery of the circular dial 3 will directly indicate the diameter of the spot being insonified in the vicinity of the target at the same time that the target depth is being indicated on any of the range scales by the position of the rotating flashing gas discharge tube. By changing the range setting during the presence of a specific target, the depth reading will move to a different position on the periphery of the dial 3 because of the shift in scale being used. Since the insonified circle diameter scale remains fixed for all range settings, the new diameter of the insonified spot when the range scale setting is changed will be shown directly on the "SPOT DIA" scale marked on the inner periphery of circular dial 3 shown in FIG. 1.

The particular beam angles and range scales chosen in Applicant's illustrative embodiment of his invention results in a very useful and convenient design for an average user of an ultrasonic depth sounder or "fish finder". The inventive system effectively gives the user the equivalent of three separate sonar systems, each with a different degree of resolution and with the convenience of being able to change characteristics at the touch of a control knob.

If a different embodiment of the invention is desired, with different combinations of beam angles and ranges, the basic criterion that must be met in accordance with the teachings of this invention is to make the ratio of the maximum diameter of the active portion of a composite circular multi-beam transducer to the minimum diameter of the active central disc portion approximately the same as the ration of the maximum to the minimum full scale range desired for the depth sounder.

Applicant has not shown any details of the electronic circuit components that may be used in carrying out the system functions described in this application because they are well known in the art and do not in themselves form any part of this invention. Neither have any specific structural or assembly details of the underwater transducer been shown because they also are well known in the art of underwater sonar and do not in themselves form any part of this invention. This invention is concerned only in the new combinations disclosed in this application of well known component elements such as are currently employed in contemporary state of the art depth sounders to achieve a great improvement in the performance characteristics of an underwater depth sounder and also to provide the user of the equipment with means for controlling the field of "view" in the vicinity of the underwater target in much the same manner as a multiple lens or a zoom lens camera is used for obtaining a wide angle view or a telephoto close-up view of a particular scene. Additionally, the inventive system also provides a direct reading scale on the face of the instrument dial that reads the diameter of the spot being insonified in the vicinity of the target as well as reading the target depth.

Several specific embodiments of this invention have been illustrated and described and it will be obvious to one skilled in the art that additional modifications may be made without departing from the true spirit and scope of the invention; therefore, the appended claims are intended to cover all equivalents that will fall within the true spirit and scope of this invention.

I claim:

1. In combination in a sonic depth sounder which includes an electrical source of power, a directional electroacoustic transducer and a visual display means with a plurality of selectible range scales for reading the depth of a submerged reflecting target when it appears within the path of the radiated sound from the directional transducer, said transducer characterized in that the vibratile surface of the transducer is divided into a plurality of sections, a plurality of electrical conductors connected to said plurality of transducer sections, switching means connecting said plurality of electrical conductors in any specified combination, whereby a plurality of different specified beam widths are selectively available from said transducer, said visual display means including range selector means for selecting any one of said plurality of range scales on said display means, coupling means between said range selector means and said switching means, said coupling means characterized in that a particular beam width is selected for operation in combination with a particular range setting, said transducer further characterized in that said plurality of transducer beam widths are in approximate inverse proportion to the depth range scales with which the beam widths are selectively combined, whereby the area of the insonified target region at each different full-scale range is approximately the same.

2. The invention in claim 1 and an additional scale included on said display means for reading the diameter of the target area being insonified at the particular target distance being indicated on the particular range scale.

3. The invention in claim 2 characterized in that said additional scale is superimposed on the multirange depth measurement scale.

4. The invention in claim 1 further characterized in that the transducer comprises a circular piston source made up of separate concentric circular portions including a central disc portion and an outer annular portion, and further characterized in that the diameter of said central disc portion is in the approximate range 1½ to 3½ wavelengths of the sound generated by the transducer.

5. The invention in claim 1 characterized in that said plurality of range scales include depth ranges of magnitudes R1 and R2, and further characterized in that said transducer beam widths include beam widths whose values are in the approximate ratio R2/R1.

6. The invention in claim 5 further characterized in that R1 is approximately 100 ft. and the magnitude of the selectively combined transducer beam is approximately 25°.

7. In combination in a sonic depth sounder, a directional electroacoustic transducer characterized in that a plurality of different beam widths can be selectively obtained from the transducer by a selective choice of electrical connections to the transducer, display means characterized in that said display means includes a plurality of scales marked with a plurality of depth ranges, range selector means for selecting any one of said plurality of depth ranges and switching means controlled by said range selector means for selectively choosing a particular transducer electrical connection to produce a particular beam width for a particular setting of the range selector means, said range selector means characterized in that for any particular range setting, the particular transducer electrical connection chosen by the controlled switching means produces a beam width which is in inverse proportion to the selected range, thereby keeping the insonified area approximately constant at the various full-scale range settings of the depth sounder.

8. The invention in claim 7 characterized in that said display means includes means for indicating the diameter of the target area being insonified at the particular target distance being indicated on said display means.

* * * * *

UNITED STATES PATENT AND TRADEMARK OFFICE
CERTIFICATE OF CORRECTION

PATENT NO. : 4,084,150
DATED : April 11, 1978
INVENTOR(S) : Frank Massa

It is certified that error appears in the above-identified patent and that said Letters Patent are hereby corrected as shown below:

On the cover sheet (Item 75) address of the inventor should read:

-- Cohasset, Mass. --.

Signed and Sealed this

Sixth Day of March 1979

[SEAL]

Attest:

RUTH C. MASON
*Attesting Officer*

DONALD W. BANNER
*Commissioner of Patents and Trademarks*